United States Patent [19]

Krasznai et al.

[11] Patent Number: 5,390,588
[45] Date of Patent: Feb. 21, 1995

[54] TOASTING CAVITY FOR AN ELECTRIC TOASTER

[75] Inventors: Charles Z. Krasznai, Fairfield; Richard B. Kosten, West Haven, both of Conn.

[73] Assignee: Black & Decker Inc., Newark, Del.

[21] Appl. No.: 178,998

[22] Filed: Jan. 7, 1994

[51] Int. Cl.[6] .............................................. A47J 37/04
[52] U.S. Cl. ........................................ 99/389; 99/401; 99/447; 219/405
[58] Field of Search .................. 99/378, 401, 447, 389, 99/385; 219/405, 411

[56] References Cited

U.S. PATENT DOCUMENTS

| | | | |
|---|---|---|---|
| 2,042,855 | 6/1936 | Merklein . | |
| 2,368,026 | 1/1945 | Jepson | 99/389 |
| 2,631,523 | 3/1953 | Olving | 99/326 |
| 2,912,922 | 11/1959 | Schmall | 99/340 |
| 3,152,242 | 10/1964 | DeMott . | |
| 3,152,243 | 10/1964 | Andrews . | |
| 3,334,620 | 8/1967 | DeWerth . | |
| 3,347,153 | 10/1967 | Sutton | 99/337 |
| 3,348,472 | 10/1967 | Anetsberger et al. | 99/447 |
| 3,585,360 | 6/1971 | Young | 219/405 |
| 3,682,441 | 12/1971 | Schmall | 99/340 |
| 3,693,538 | 9/1972 | Snyder | 219/405 |
| 3,789,748 | 2/1974 | Rappoport | 99/340 |
| 4,345,513 | 8/1982 | Holt | 99/327 |
| 4,455,479 | 6/1984 | Itoh et al. | 219/405 |
| 4,487,116 | 12/1984 | Routhier | 99/401 |
| 4,491,066 | 1/1985 | Juriga et al. | 99/391 |
| 4,628,185 | 12/1986 | Norwood et al. | 219/386 |
| 4,781,170 | 11/1988 | Perl | 219/405 |
| 4,889,042 | 12/1989 | Hantz et al. | 99/340 |

*Primary Examiner*—David A. Scherbel
*Assistant Examiner*—Reginald L. Alexander
*Attorney, Agent, or Firm*—Barry E. Deutsch

[57] ABSTRACT

An electric toaster includes a housing defining a toaster cavity. A comestible support rack is mounted within the toasting cavity for supporting the bread to be toasted in a horizontal plane within the cavity. The toaster includes first and second heaters mounted respectively above and below the support rack. The cavity includes radiant energy reflecting surfaces above and below the support tray to direct energy generated by the heaters of the toaster to uniformly toast each side of the comestible. Heat shields are positioned between each of the heaters and the food support rack. The heat shields aid the reflective surfaces in uniformly toasting the surfaces of the comestible.

15 Claims, 2 Drawing Sheets

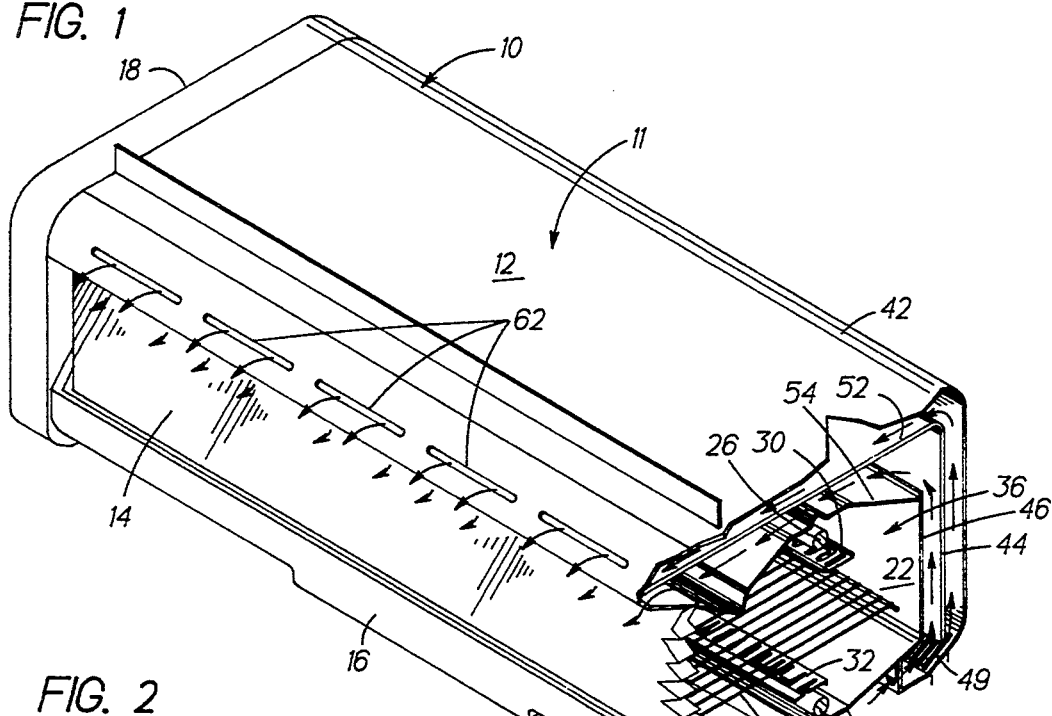
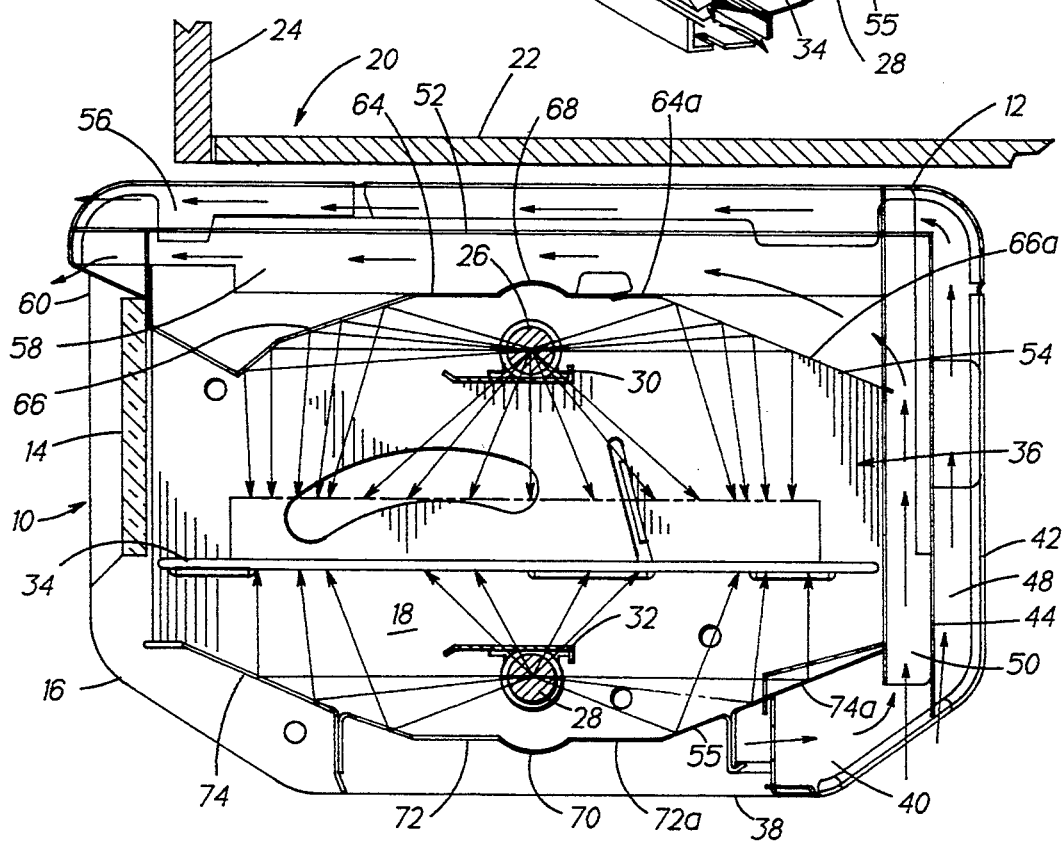

TOASTING CAVITY FOR AN ELECTRIC TOASTER

BACKGROUND OF THE INVENTION

This invention relates to an electric toaster and in particular to the structure of the toasting cavity.

It has heretofore been known to manufacture relatively large toaster/ovens which enable a user to toast a plurality of comestibles such as bread in a horizontal plane. Such toaster ovens are relatively large and are not conveniently suspended from the bottom surface of a kitchen cabinet. It is desirable to suspend appliances such as toasters, coffeemakers, can openers and the like from the lower surface of a kitchen cabinet to save countertop space.

When a toaster is suspended from the bottom surface of a kitchen cabinet, the comestibles inserted into the toaster should be maintained in a horizontal plane in the toasting cavity. One of the problems associated with having a toaster which effectively has horizontal toaster slots, rather than vertical toaster slots as is typical in countertop toasters, is obtaining uniform toast color on the top and bottom of the comestible. Since hot air rises, the bottom surface of the comestible generally is heated at a faster rate than is the top surface.

It has been found that one way to achieve generally uniform toast color between the top and bottom surfaces is to employ heater cards or the like above and below the comestible support tray. The use of such heater cards generally increases the cost of the toaster, reduces the cleanability of the toaster and requires a relatively large toaster cavity.

It is desirable from an aesthetic standpoint to have a relatively low profile or low height toaster when the same is suspended from the bottom of a kitchen cabinet. To achieve the foregoing and overcome the problems associated with the use of heater cards, it is desirable to have a single heater mounted above and a single heater mounted below the support rack. The heater may be made from quartz or glass. The single heater is generally vertically aligned with the center of the support rack. However, it has been found that the use of a single heater in a relatively low profile horizontal toaster exacerbates the problem associated with obtaining uniform toast color on both the upper and lower surfaces of the comestible.

The single heater must be mounted generally in close proximity to the upper and lower surfaces of the support rack to toast the comestible within a reasonable period of time and at relatively low wattage. The portions of the comestible directly above or below the heaters toast much quicker than the portions of the comestible not in alignment with the heaters. Further, it has been found that during normal operation, the central portion of the heater becomes much hotter than the ends. Accordingly, the color of the toasted surfaces of the comestible is not uniform either when comparing the top surface to the bottom surface or even more undesirably between the inner and outer portions of a single surface. If the outer portion of a surface is toasted to a desired color the inner portion tends to be overtoasted; while if the inner portion is toasted to a desirable color then the outer portion is generally too light.

Accordingly, it is an object of this invention to manufacture a low profile toaster having a toaster cavity designed to achieve uniform toast color on and between the upper and lower surfaces of the comestible.

SUMMARY OF THE INVENTION

The foregoing object and other objects of the invention are attained in a low profile toaster including a housing defining a toasting cavity. The food support rack is mounted within the toasting cavity for supporting the comestible to be toasted in the horizontal plane. A first heater is mounted in a horizontal plane and is spaced vertically above the support rack. A first heater shield is disposed below the lower surface of the heater between the heater and the top surface of the rack and includes means defining a plurality of openings for transmitting radiant heat energy generated by the first heater towards the top surface of the comestible. A first radiant energy reflecting surface is spaced above the top surface of the first heater for directing radiant energy generated by the heater towards the top surface of the comestible. A second heater is spaced below the support rack. A second heater shield is disposed above the top surface of the second heater between the heater and the lower surface of the rack and includes means defining a plurality of openings for transmitting radiant heat energy generated by the second heater towards the lower surface of the comestible. A second radiant energy reflecting surface is spaced vertically below the bottom surface of the second heater for directing radiant energy generated by the second heater towards the bottom surface of the comestible.

The present invention further includes a radiant energy reflecting surface for a toaster having a first heater mounted in a horizontal plane and spaced vertically above a comestible support rack disposed in the toaster's toasting cavity. The reflecting surface includes a generally arcuate surface in substantial vertical alignment with the top surface of the heater. Each of the ends of the arcuate surface respectively join a first end of a connected horizontal surface. The other end of each horizontal surface is connected to one end of a downwardly inclined surface so that the vertical distance between the arcuate surface of the reflecting surface and the rack is greater than the vertical distance between any point along the inclined surface and the rack and the smallest vertical distance between the rack and the reflecting surface is at the ends of the inclined surface remote from the horizontal surface.

The invention further includes a heat shield for a toaster having a first heater mounted in a horizontal plane and spaced vertically above a comestible support rack disposed in the toaster toasting cavity. The heat shield includes a plurality of openings spaced along the length of the shield. The area of the openings about the center of the shield are smaller relative to the area of the openings adjacent each end of the shield.

BRIEF DESCRIPTION OF THE DRAWING

FIG. 1 is a perspective view, partially broken away, of a toaster embodying the present invention;

FIG. 2 is a side elevational view of the toaster illustrated in FIG. 1; and

DESCRIPTION OF THE PREFERRED EMBODIMENT

Figure 3:
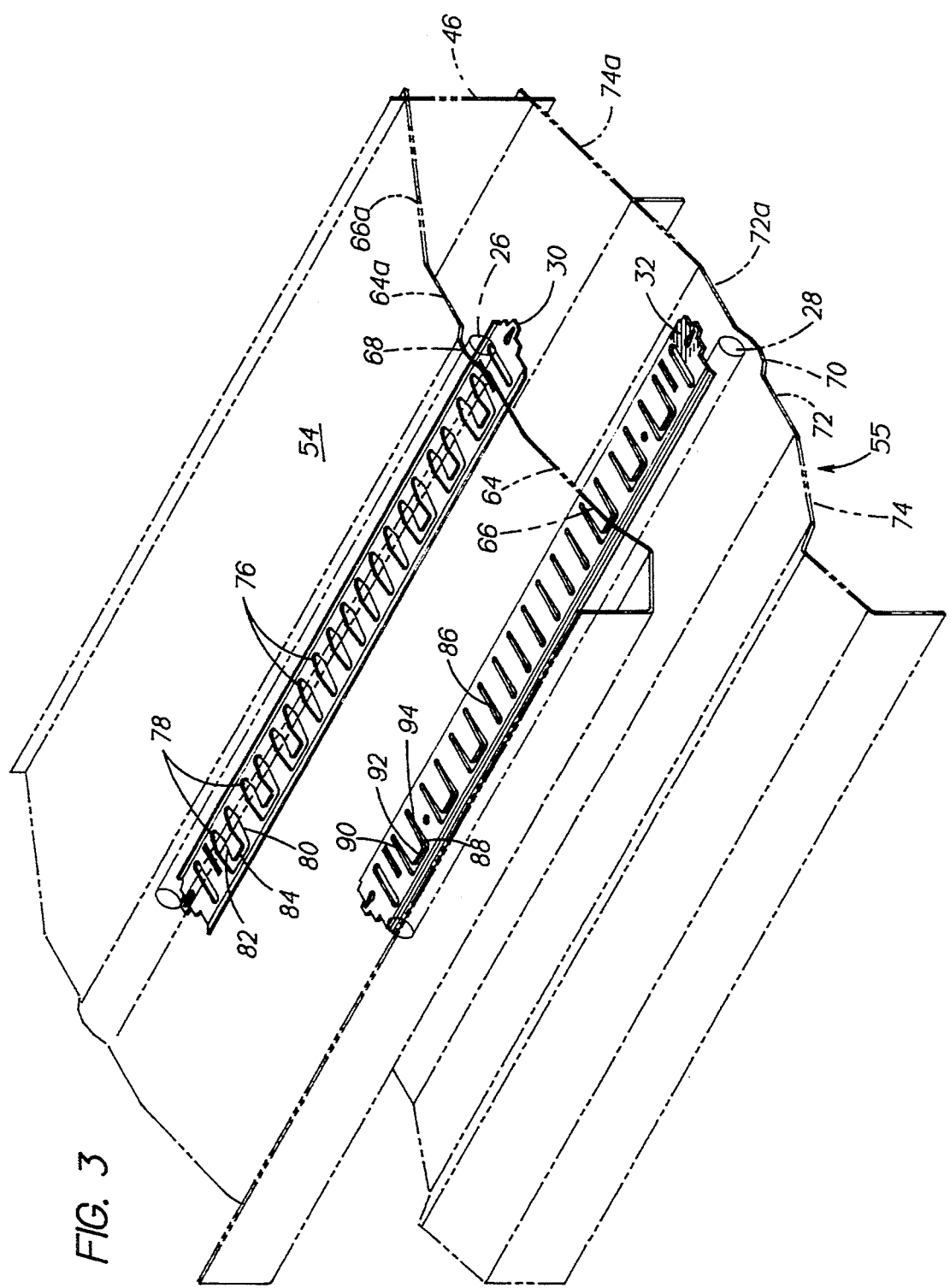
FIG. 3 is a perspective view illustrating the shields of the toaster in solid line and the reflector of the toaster in phantom.

Referring now to the various figures of the drawing, there is disclosed a preferred embodiment of the present invention. In referring to the various figures, like numerals shall refer to like parts.

The present invention is embodied in electric toaster 10, which as shown in FIG. 2, is designed to be suspended under the bottom surface of kitchen cabinet 20. Cabinet 20 includes a front wall 24 and a bottom wall 22. A suitable support system for suspending toaster 10 from kitchen cabinet 20 is described and illustrated in co-pending U.S. application Ser. No. 08/178,973 pending, filed Jan. 7, 1994, in the names of Richard B. Kosten and Charles Z. Krasznai and assigned to the same assignee as the assignee hereof.

Toaster 10 includes an outer housing 11, comprising top wall 12, rear wall 42, bottom wall 38, side walls 18 (only one of which is shown) and front wall or door 14. In the preferred embodiment, front wall 14 is made from glass or other translucent or transparent material and is mounted on pivotal support frame 16. Frame 16 pivots about a pivot pin so that the door 14 moves downwardly with respect to the suspended toaster to provide access to the interior thereof for either loading or unloading the toasting chamber 36.

Toaster 10 further includes a pair of vertically spaced electrical heaters 26,28. Heaters 26 and 28 are mounted respectively above and below a toasting rack 34 supported in toasting chamber 36 on side walls 18. Heater 26 has a shield 30 disposed below the lower surface thereof while heater 28 has a shield 32 disposed above the top surface thereof. Details of shields 30 and 32 shall be more fully described hereinafter.

Toasting chamber 36 is defined by door 14, upper wall 54, lower wall 55, back wall 46, and side walls 18. Walls 54 and 55 extend in a horizontal plane while wall 46 extends in a vertical plane. Walls 54, 55 and 46 are spaced from the respective top, bottom, and rear walls 12,38 and 42 of toaster housing 11. Partition wall 44 extends vertically in the space between outer wall 42 of housing 11 and wall 46 defining the rear of toasting compartment 36. Partition wall 44 divides the space into an inner air path 50 and outer air path 48. Inner air path 50 communicates with air plenum 40. Plenum 40 in turn is in fluid flow communication with air inlet opening 49 formed in bottom wall 48. While most of the air passing through the inlet opening 49 enters plenum 40, a very small section of the opening extends beyond partition wall 44 to enable a small quantity of ambient air to enter into air path 48.

Partition wall 44 extends vertically upward and connects with a horizontally extending wall 52. Inner air flow path 50 extends upwardly and is in fluid communication with a horizontally extending air flow path 58. Air flow path 48 extends upwardly and is in fluid flow communication with horizontally extending air flow path 56. Partition wall 52 separates the horizontally extending flow paths into inner flow path 58 and outer flow path 56. Inner flow path 58 terminates at outlet air vent 60 provided at the front of the toaster while the outer flow path 56 terminates at outlet vents 62 which are also provided at the front of toaster 10. For a more detailed description of the venting system for the toaster embodying the present invention reference may be had to co-pending U.S. patent application Ser. No. 08/178,997 filing date Jan. 7, 1994 now U.S. Pat. No. 5,379,685 entitled "Venting System For An Electric Toaster" filed in the name of Charles Z. Krasznai and assigned to the same assignee as the assignee hereof.

Walls 54 and 55 of toasting chamber 36 provide radiant energy reflecting surfaces. Wall 54 includes an arcuate portion 68 in substantially vertical alignment with the top surface of heater 26. The spaced ends of arcuate portion 68 are each connected to a separate horizontally extending portion 64 and 64a. The end of portion 64 remote from arcuate portion 68 is, in turn, connected to a downwardly inclined surface 66. Likewise the end of portion 64a remote from portion 68 is connected to a downwardly inclined surface 66a.

Wall 55 is substantially identical to wall 54 and includes an arcuate surface 70 substantially in vertical alignment with heater 28. The spaced ends of arcuate portion 70 are attached to one end of horizontally extending portions 72 and 72a. The ends of surfaces 72 and 72a remote from arcuate portion 70 are connected to upwardly inclined surfaces 74 and 74a.

As illustrated, inclined surfaces 66 and 66a of wall 54 are downwardly inclined so that the vertical distance between the arcuate surface 68 of wall 54 and food support rack 34 is greater than the vertical distance between any point along either inclined surface 66 and 66a and the rack. The smallest distance between the rack and wall 54 is at the ends of the inclined surfaces 66 and 66a remote from arcuate surface 68.

Similarly, the vertical distance between arcuate surface 70 of wall 55 and rack 34 is greater than is the vertical distance between any point along inclined surfaces 74 and 74a and rack 34. The smallest vertical distance between rack 34 and wall 55 is at the end of inclined surfaces 74 and 74a remote from arcuate surface 70.

In the preferred embodiment, the vertical distance between support rack 34 and upper heater 26 is greater than is the vertical distance between the rack and second heater 28. By increasing the distance between the upper surface of rack 34 and the lower surface of heater 26, thicker slices of the comestible may be placed on support rack 34.

It is intended for toaster 10 to be suspended from the lower surface of kitchen cabinet 20. For aesthetic purposes, it is desirable that the height of the toaster be relatively low, known as a "low-profile" design, when compared to the height of a typical toaster oven designed to stand on the top of a kitchen counter. As the total height of the toaster is relatively small, food support rack 34 must as a consequence be positioned relatively close to the surfaces of heaters 26 and 28.

As illustrated in the figures of the drawing, in the preferred embodiment it is preferable to employ a single heater above and a single heater below the support rack for heating the surfaces of the comestible. To obtain uniform heating within toasting chamber 36, it is desirable that the heaters are mounted in a horizontal plane and along the center line of the chamber extending between side walls 18. In the absence of the radiant energy reflecting surfaces of the present invention, the radiant energy reflected by the portion of the upper and lower walls in vertical alignment with heaters 26,28 would be at a maximum level. The radiant energy reflected by the portion of the upper and lower walls remote from heaters 26 and 28 would be at a minimum level. Thus, the color of each surface of the comestible would not be uniform when comparing the central portion to the peripheral portion. The central portion of each surface would be darker in color when compared to the peripheral portion of the surface. By shaping walls 54 and 55 as described and by placing arcuate portions 68 and 70, which are vertically aligned with heaters 26,28 at a relatively greater distance from the surface of the support tray when compared to the distance between the support tray and inclined surfaces 66, 66a, 74 and 74a, more of the radiant energy generated by the heaters will be directed towards the peripheral portion of the underlying comestible surface. The dispersion of the radiant energy towards the peripheral portion of the surface compensates for the greater amount of heat transmitted to the central portion of the surface through radiation, convection and conduction.

As a further impediment to obtaining uniform toast color on both sides of a comestible, the bottom tends to toast faster than the top because the heat given off by the lower heater 28 rises directly onto the lower surface of the comestible. The heat generated by the upper heater 26 also has a tendency to rise so that it does not heat the upper surface of the comestible as quickly. Further, in the preferred embodiment the upper heater is spaced at a greater distance above the upper surface of the comestible when compared to the spacing between the lower heater and the lower surface of the comestible. It is thus difficult to obtain uniform toast color on each of the surfaces and uniform toast color between the upper and lower surfaces of the comestible.

As discussed above, the upper and lower walls 54 and 55 of toasting chamber 36 are designed to obtain uniform toast color for each surface. To attain uniform toast color between the upper and lower surfaces shields 30 and 32 have been added to the toasting chamber. Shield 30 is disposed between the lower surface of upper heater 26 and the top surface of the support rack 30 and shield 32 is disposed between the upper surface of lower heater 28 and the bottom surface of support rack 34.

Shield 30 extends parallel to and for the entire length of heater 26. Shield 30 includes a plurality of oval shaped openings 76 disposed at its center and a plurality of generally U-shaped openings provided at each end of the shield. U-shaped openings 78 include transverse arms 80 and 82 which are connected by an axially extending arm 84. The total cross-sectional area of the openings 76 about the center of the shield is relatively smaller when composed to the total cross-sectional area of the openings 78 at either end of the shield.

Shield 32 includes a plurality of relatively thin, somewhat oval shaped openings 86 axially spaced about its center portion and a plurality of generally U-shaped openings 88 provided at either end of the shield. Each opening 88 includes transverse legs 90 and 94 connected by an axially extending leg 92. The total area of openings 86 about the center of shield 32 is smaller relative to the total area of the openings 88 adjacent each end of shield 32. Further, the total area of the openings 76 and 78 formed in upper shield 30 is relatively greater when compared to the total area of the openings 86 and 88 formed in lower shield 32.

It has been found that the heat generated by heaters 26 and 28 is greater about the center of the heater than at either end thereof. By forming openings 76 and 86 at the center of each shield 30 and 32 smaller than the openings 78 and 88 formed at the ends of each shield, the shields balance the radiant energy transmitted from the heaters along the length of each heater. Further, since the total open area in shield 30 is greater than the open area in shield 32, the radiant energy transmitted directly through shield 30 is greater than the energy transmitted through shield 32.

It has been found that the combination of the radiant energy reflecting surfaces 54 and 55 and the heat shields 30 and 32 result in a toasted product of uniform color on each side and from side to side.

While a preferred embodiment of the present invention has been described and illustrated, the invention should not be limited thereto but may be otherwise embodied within the scope of the following claims.

What is claimed is:

1. A low-profile toaster comprising:
   a housing;
   a toasting cavity defined by the housing;
   a comestible support rack mounted within the toasting cavity for supporting the comestible to be toasted in a horizontal plane;
   a first heater mounted in a horizontal plane along a vertical axis extending substantially through the center of the toasting cavity and spaced vertically above the comestible support rack;
   a first heater shield disposed below the lower surface of the heater between the heater and the top surface of the rack and including means defining a plurality of openings for transmitting radiant heat energy generated by the first heater towards the top surface of the comestible;
   a radiant energy reflecting surface spaced vertically above the top surface of the first heater for directing radiant energy generated by the heater towards the top surface of the comestible;
   a second heater mounted in a horizontal plane along a vertical axis extending substantially through the center of the toasting cavity and spaced vertically below the support rack;
   a second heater shield spaced above the top surface of the second heater between the heater and the bottom surface of the rack and including means defining a plurality of openings for transmitting radiant heat energy generated by the second heater towards the bottom surface of the comestible; and
   a second radiant energy reflecting surface spaced vertically below the bottom surface of the second heater for directing radiant energy generated by the second heater towards the bottom surface of the comestible.

2. A toaster according to claim 1 wherein the toaster is suspended from the bottom surface of a kitchen cabinet.

3. A toaster according to claim 2 wherein the vertical distance between the comestible support rack and the first heater is greater than the vertical distance between the rack and the second heater.

4. A toaster according to claim 3 wherein the area of the openings formed in the first heater shield is greater than the area of the openings formed in the second heater shield.

5. A toaster according to claim 4 wherein the area of each of the openings formed in the first heater shield is greater at the ends of the shield relative to the area of the openings about the center of the shield.

6. A toaster according to claim 1 wherein the vertical distance between the comestible support rack and first heater is greater than the vertical distance between the rack and second heater.

7. A toaster according to claim 6 wherein the area of the openings formed in the first heater shield is greater than the area of the openings formed in the second heater shield.

8. A toaster according to claim 7 wherein the area of each of the openings formed in the first heater shield is greater at the ends of the shield relative to the area of the openings about the center of the shield.

9. A toaster according to claim 1 wherein the area of the openings formed in the first heater shield is greater than the area of the openings formed in the second heater shield.

10. A toaster according to claim 9 wherein the area of each of the openings formed in the first heater shield is greater at the ends of the shield relative to the area of the openings about the center of the shield.

11. A toaster according to claim 1 wherein the area of each of the openings formed in the first heater shield is greater at the ends of the shield relative to the area of the openings about the center of the shield.

12. A heat shield for a toaster having a first heater mounted in a horizontal plane and spaced vertically about a comestible support rack disposed in the toaster toasting cavity, said heat shield comprising:

means defining a plurality of openings spaced along the length of the shield, the area of the openings about the center of the shield being smaller relative to the area of the openings adjacent each end of the shield.

13. A heat shield in accordance with claim 12 wherein the openings at the center of the shield are substantially oval-shaped.

14. A heat shield in accordance with claim 13 wherein each of the openings adjacent each end of the shield is substantially U-shaped.

15. A heat shield in accordance with claim 12 wherein each of the openings adjacent each end of the shield is substantially U-shaped.

* * * * *